United States Patent [19]
Myers et al.

[11] Patent Number: 5,639,430
[45] Date of Patent: Jun. 17, 1997

[54] LOW PRESSURE DROP, TURBULENT MIXING ZONE DRY SCRUBBER

[75] Inventors: Robert Bruce Myers, Copley Township; Dennis Wayne Johnson, Barberton, both of Ohio

[73] Assignee: The Babcock & Wilcox Company, New Orleans, La.

[21] Appl. No.: 720,855

[22] Filed: Oct. 2, 1996

Related U.S. Application Data

[63] Continuation of Ser. No. 319,847, Oct. 7, 1994, abandoned.

[51] Int. Cl.$^6$ .................... F01N 3/08; B01D 53/34
[52] U.S. Cl. .................. 422/176; 422/168; 422/169; 422/172; 422/111; 422/224; 422/228; 55/220; 55/257.5; 261/116
[58] Field of Search .................... 422/168–172, 422/176, 143, 195, 224, 228, 110–111; 423/243.1, 243.08, 244.07; 55/220, 224, 257.5; 261/116

[56] References Cited

U.S. PATENT DOCUMENTS

| | | | |
|---|---|---|---|
| 4,013,504 | 3/1977 | Morris | 159/4 |
| 4,452,765 | 6/1984 | Peterson et al. | 423/242 |
| 4,460,552 | 7/1984 | Zakrzewski | 423/243.08 |
| 4,610,849 | 9/1986 | Van Camp et al. | 422/168 |
| 4,819,878 | 4/1989 | Bailey et al. | 239/427 |
| 4,980,099 | 12/1990 | Myers et al. | 261/116 |
| 5,194,076 | 3/1993 | Myers et al. | 55/220 |
| 5,213,768 | 5/1993 | Maurel et al. | 422/143 |
| 5,270,019 | 12/1993 | Melton et al. | 422/224 |

FOREIGN PATENT DOCUMENTS 2084896  4/1982  United Kingdom.

OTHER PUBLICATIONS

Anderson, DePriest & Edwards "Dry $SO_2$ system design and early operating experience at Basin electrics Laramie, River Station", Presented to ASME Joint Poner Generation Conference, Denver CO, Oct. 17–21, 1982 also to 32 nd Canadian Chemical Engineering Conference, Vancouver, British Columbia, Canada Oct. 3–6, 1982, Entire Paper.

Doyle Jankura & Vettrick Technical Paper "Comparison of Dry Scrubbing Operation of Laramie River & Craig Stations", Presented to Symposium on Flue Gas Desulfurization, Atlanta, GA, Nov. 16–21, 1986. Entire Paper.

Hurst, "Dry Scrubbing eliminates wet sludge" Technical Paper Presented to Joint Power Generation Conference, Charlotte, NC, Oct. 7–11, 1979. Entire Paper.

Downs, Sanders & Miller "Control of $SO_2$ emissions by dry scrubbing" Technical Paper Presented to American Power Conference, Apr. 21–23, 1980. Entire Paper.

Hurst & Bielawski "Dry Scrubber Demonstration plant-operating results", Presented to EPA Symposium on Flue Gas Desulfurization, Oct. 28–31, 1980, Entire Paper.

*Primary Examiner*—Robert J. Warden
*Assistant Examiner*—Hien Tran
*Attorney, Agent, or Firm*—Robert J. Edwards; Eric Marich

[57] ABSTRACT

Contaminants such as sulfur oxides are removed from flue gas in a low pressure drop, turbulent mixing zone, vertical dry scrubber by channeling the flue gas through a low pressure drop gas distribution means which controls flue gas introduction to the scrubber, along with control of reagent introduction, by treating the flue gas with a finely atomized alkali solution or slurry reagent preferably from a single or multiple array of dual-fluid atomizers. The atomizers create a turbulent mixing zone downstream of the gas distribution means which results in a homogeneous distribution of the alkali solution or slurry reagent in the flue gas. Control means are provided for creating and maintaining the turbulent mixing zone. A transition at the bottom of the dry scrubber is used to entrain any particulates and/or spray dried materials in the bulk gas stream exiting the dry scrubber.

8 Claims, 7 Drawing Sheets

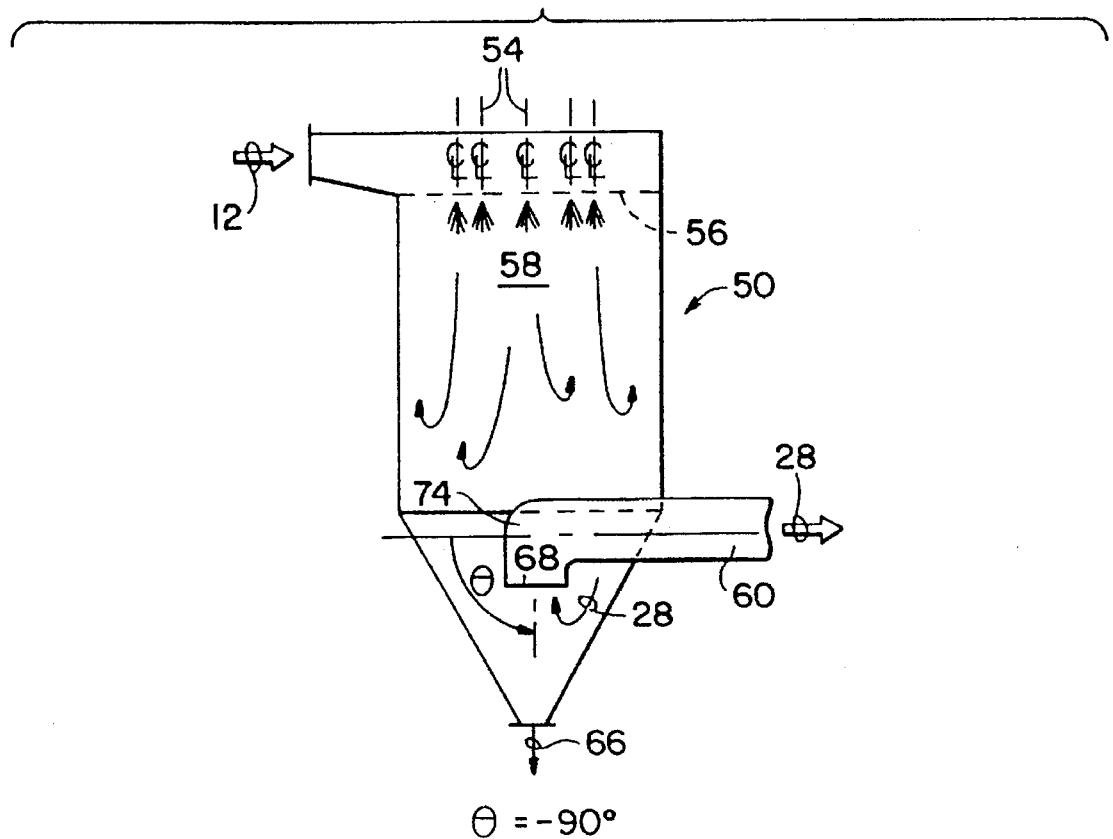
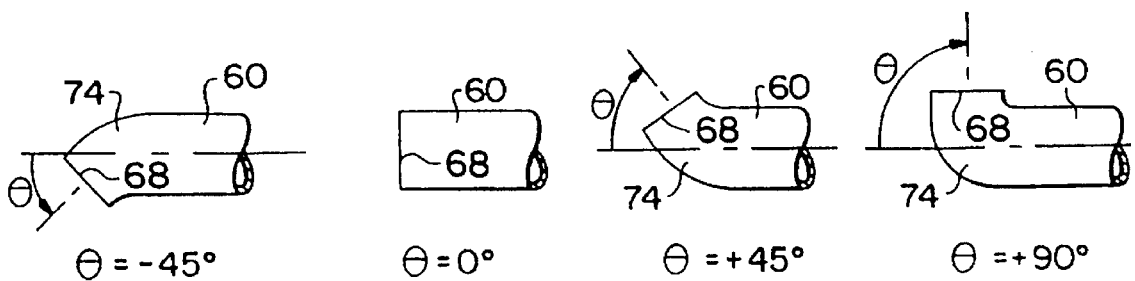

LOW PRESSURE DROP, TURBULENT MIXING ZONE DRY SCRUBBER

This is a continuation of application Ser. No. 08/319,847 filed Oct. 7, 1994, now abandoned.

FIELD AND BACKGROUND OF THE INVENTION

The present invention relates, in general, to an improved method to control the removal of contaminants from flue gas and, in particular, to a new and useful apparatus and method for controlling removal of contaminants such as sulfur oxides, acid gases, and air toxics from flue gas through the use of a dry scrubber.

Because electric power generating plants and other industries combust fossil fuels such as coal, oil, petroleum coke, and/or waste materials, various contaminants such as sulfur oxides, acid gases, and air toxics appear in the flue gas produced during combustion. Several methods have been employed to remove these contaminants in order to comply with regulatory requirements and emission standards.

One approach that has been used to comply with federal and state emission requirements involves utilizing fossil fuels that are low in sulfur content and other contaminants to reduce the amount of sulfur oxides and other pollutants produced during the combustion process. Increased demand for these fuels results in increased costs due to supply/demand economics, and increased production costs to ship these fuels from distant locations may also be involved. These added costs are then passed on to the end user in the form of higher utility bills.

Other approaches to reduce the sulfur content and decrease other contaminants found in the flue gas employ mechanical and/or chemical processes to reduce the sulfur content in the fuel prior to combustion. However, these processes have proven to be very costly since a high degree of sulfur removal from the raw fuel is necessary to achieve desired reductions of sulfur emissions in the flue gas.

One known method used to reduce sulfur oxide content in the flue gas is to mix dry alkali material with the fuel prior to combustion, or to inject pulverized alkali material directly into the hot combustion gases to remove the sulfur oxides and other contaminants through absorption or adsorption. The major disadvantage of this approach is that such alkali injection usually results in low to moderate removal efficiencies, poor reagent utilization, and increased particulate loadings in the flue gas which may necessitate further conditioning of the flue gas (i.e., humidification or sulfur trioxide injection) when the injection process is conducted upstream of an electrostatic precipitator.

Another known method to reduce sulfur oxides in the flue gas is to use a wet chemical absorption process, known as wet scrubbing, wherein the hot fluid gas is washed in an upflow gas liquid contact device with an aqueous alkaline solution or slurry to remove sulfur oxides and other contaminants. Major disadvantages with this process include the loss of liquid both to the atmosphere (due to saturation of the flue gas and mist carry over) and with the sludge produced in the process. These processes also generally require special materials for construction of the absorber module and downstream auxiliary equipment, such as dewatering and waste water treatment systems.

Another known method for reducing sulfur oxides in flue gases is through a spray drying chemical absorption process, also known as dry scrubbing, wherein an aqueous alkaline solution or slurry is finely atomized (via mechanical, dual fluid, or rotary type atomizers), and sprayed into the hot flue gas to remove the contaminants. A major disadvantage involved with dry scrubbing is that there is a moderate to high pressure drop or loss across the spray dryer gas inlet distribution device, along with a limitation on the spray down temperature, (i.e., how close the temperature of the flue gas exiting the reaction chamber can approach the flue gas saturation temperature) required to maintain controlled operation of the process.

FIG. 1 illustrates a known horizontal, co-current flow dry scrubber, generally designated 10, manufactured by The Babcock & Wilcox Company. Untreated flue gas 12 enters the dry scrubber 10 through a flue gas inlet 14 and travels through the dry scrubber 10 in direction 16. The dry scrubber 10 utilizes a slurry source 18 and an air source 20 to remove sulfur oxides and other contaminants from the flue gas 12. A flush line 22 is also provided on the dry scrubber 10 to recycle unused slurry through the system. A plurality of atomizers 24 spray an atomized aqueous alkaline solution or slurry into the flue gas 12 within a spray absorption region 26. Once the sulfur oxides and other contaminants are absorbed from the flue gas 12 in the absorption region 26, treated flue gas 28 flows through an outlet 30, typically to a particulate collector (not shown).

FIG. 2 illustrates another dry scrubber, this one a known vertical, co-current, down flow dry scrubber 32. Sulfur oxides and other contaminants are removed from the flue gas 12 in the dry scrubber 32 which uses a roof gas distribution device 34 located at the top of the dry scrubber 32, as well as an inlet 36 located at a lower portion of the dry scrubber 32. Sulfur oxides and other contaminants are removed from the flue gas 12 in an absorption region 38. Particles are collected in a hopper 40 located at a lower portion of the dry scrubber 32, and treated flue gas 28 leaves the dry scrubber 32 via outlet 42.

It is thus apparent that a dry scrubber having reduced gas side pressure drop would be of great benefit since lower power consumption continues to be a goal in any emission control installation. The performance of such a dry scrubber can also be improved while minimizing deposition by controlling both the flue gas flow and reagent spray flow in a turbulent mixing zone.

SUMMARY OF THE INVENTION

The present invention controls flue gas flow and reagent flow in a low pressure drop, turbulent mixing zone dry scrubber to remove sulfur oxides and other contaminants from the flue gas. The present invention eliminates conventional gas flow distribution devices used in a dry scrubber, while simultaneously improving and controlling gas/liquid contact therein during dispersion of an alkali reagent or slurry into the flue gas stream. This approach results in increased contaminant removal efficiency, increased reagent utilization, and improved overall scrubber operation.

Accordingly, one aspect of the present invention is drawn to a low pressure drop, turbulent mixing zone dry scrubber for removing sulfur oxides and other contaminants from flue gas having a vertical chamber with a top and a bottom for treating the flue gas. An inlet is provided near the top of the chamber for providing flue gas into the chamber. Gas flow distribution means, located near the inlet, are provided for distributing the flue gas into a spray absorption mixing region of the dry scrubber, the region located beneath the gas flow distribution means. The dry scrubber also provides an atomizer means, positioned at an upper portion of the chamber in the vicinity of the gas flow distribution means, for spraying a reagent into the flue gas in the mixing region after the flue gas is distributed past the atomizer means and into the mixing region by the gas flow distribution means. The atomizer means homogeneously mixes the reagent with the flue gas in the mixing region for treating the flue gas by absorbing sulfur oxides and other contaminants from the flue gas to produce treated flue gas. The dry scrubber further provides flow control means for controlling a rate of reagent supplied by the atomizer means. Finally, the dry scrubber provides an outlet near the bottom of the mixing chamber and beneath the mixing region for directing the treated flue gas out of the chamber.

Another aspect of the present invention is drawn to a method for controlling a low pressure drop, turbulent mixing zone dry scrubber to remove contaminants from flue gas. The method channels the flue gas into the top of a vertical chamber, and controllably distributes the flue gas through a plurality of perforations and past atomizer means occupying some of said perforations and then into a spray absorption mixing region. A reagent is sprayed into the flue gas in the mixing region for treating the flue gas and absorbing sulfur oxides and other contaminants from the flue gas to produce a treated flue gas. Finally, the method channels the treated flue gas out of the chamber from a location beneath the mixing region.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

BRIEF DESCRIPTION OF THE DRAWINGS

In the drawings:

FIG. 10 is a schematic representation of various outlet configurations used in the present invention, and which defines angle theta, θ;

DESCRIPTION OF THE PREFERRED EMBODIMENTS

Figure 1:
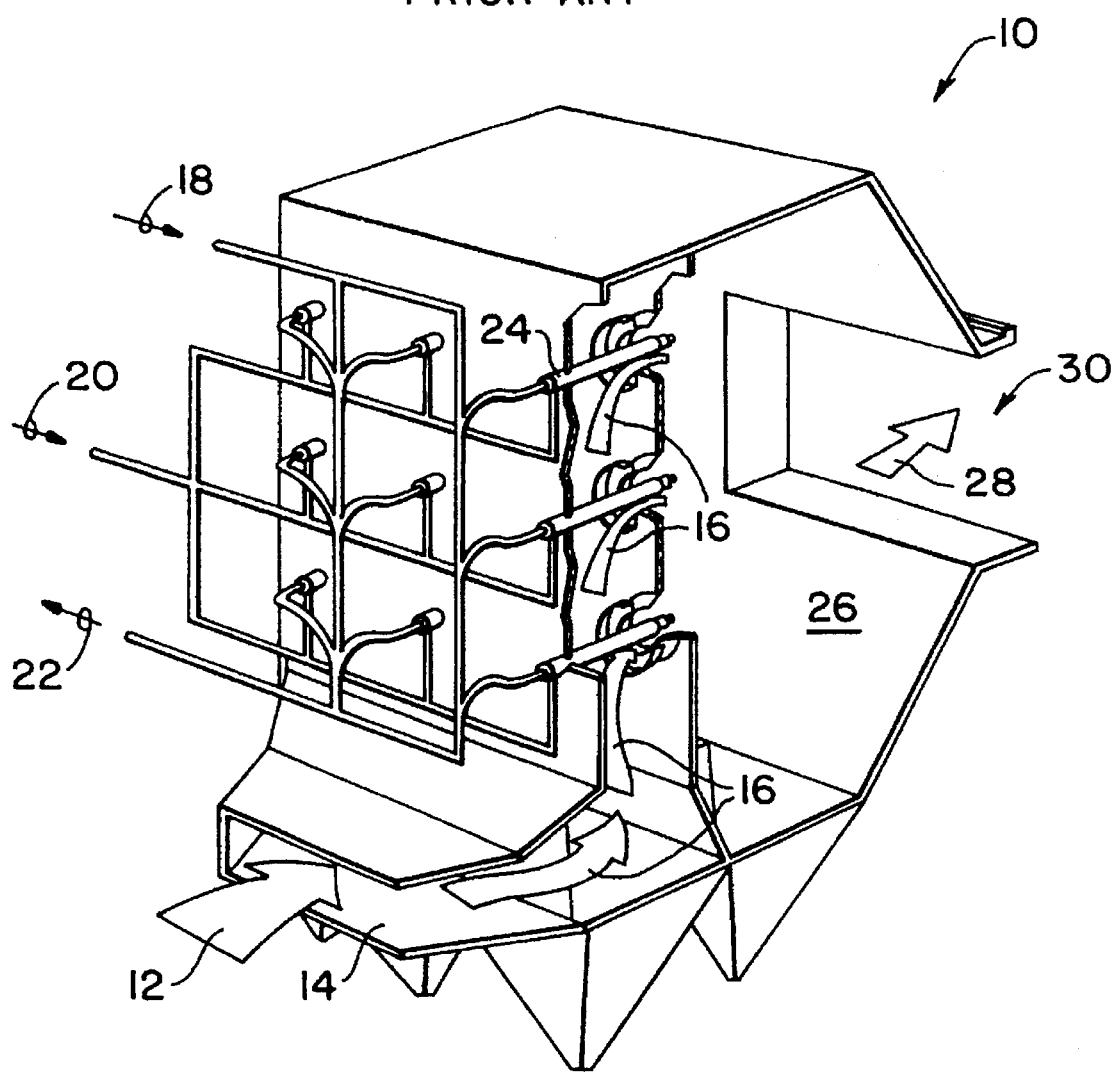
FIG. 1 is a perspective view, partly in section, of a known horizontal, co-current flow dry scrubber manufactured by The Babcock & Wilcox Company.
Figure 2A:
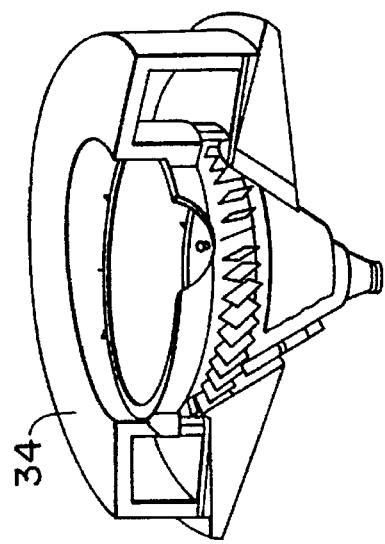
FIG. 2A is a perspective sectional view of an upper portion of the known dry scrubber of FIG. 2.
Figure 2:
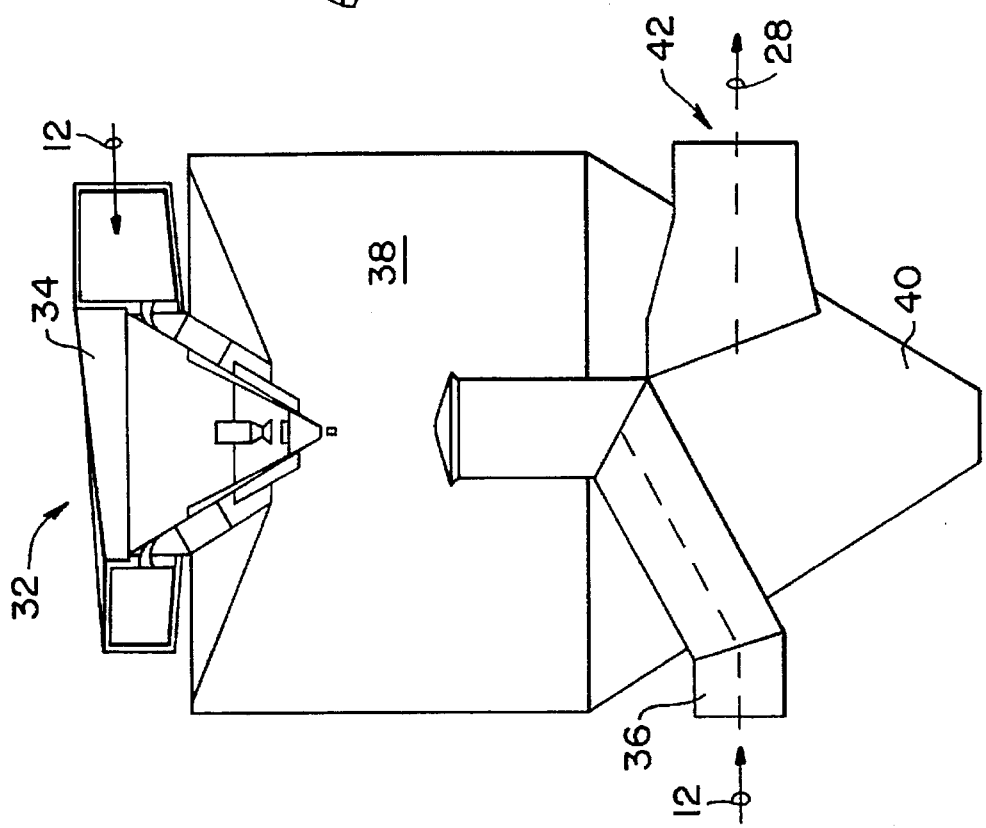
FIG. 2 is a sectional side view of a known vertical, co-current, down flow dry scrubber.
Figure 4:
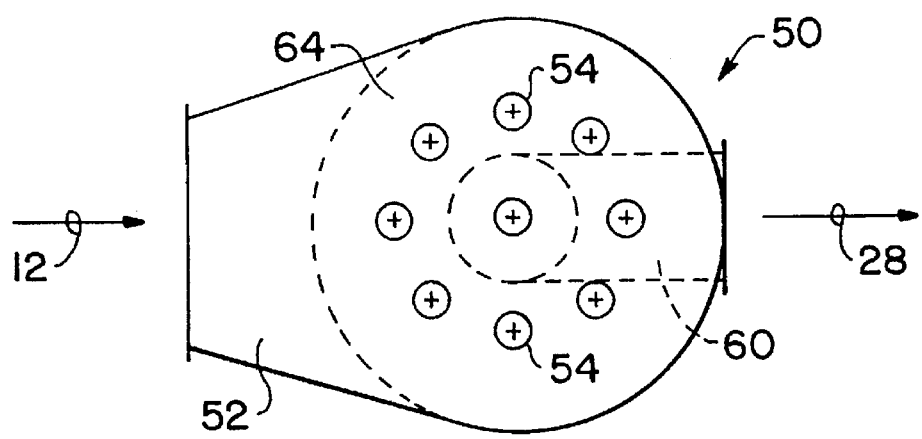
FIG. 4 is a top view of the low pressure drop, turbulent mixing zone dry scrubber of FIG. 3, taken in the direction of arrows 4—4 of FIG. 3, the top plate being omitted for clarity.
Figure 3:
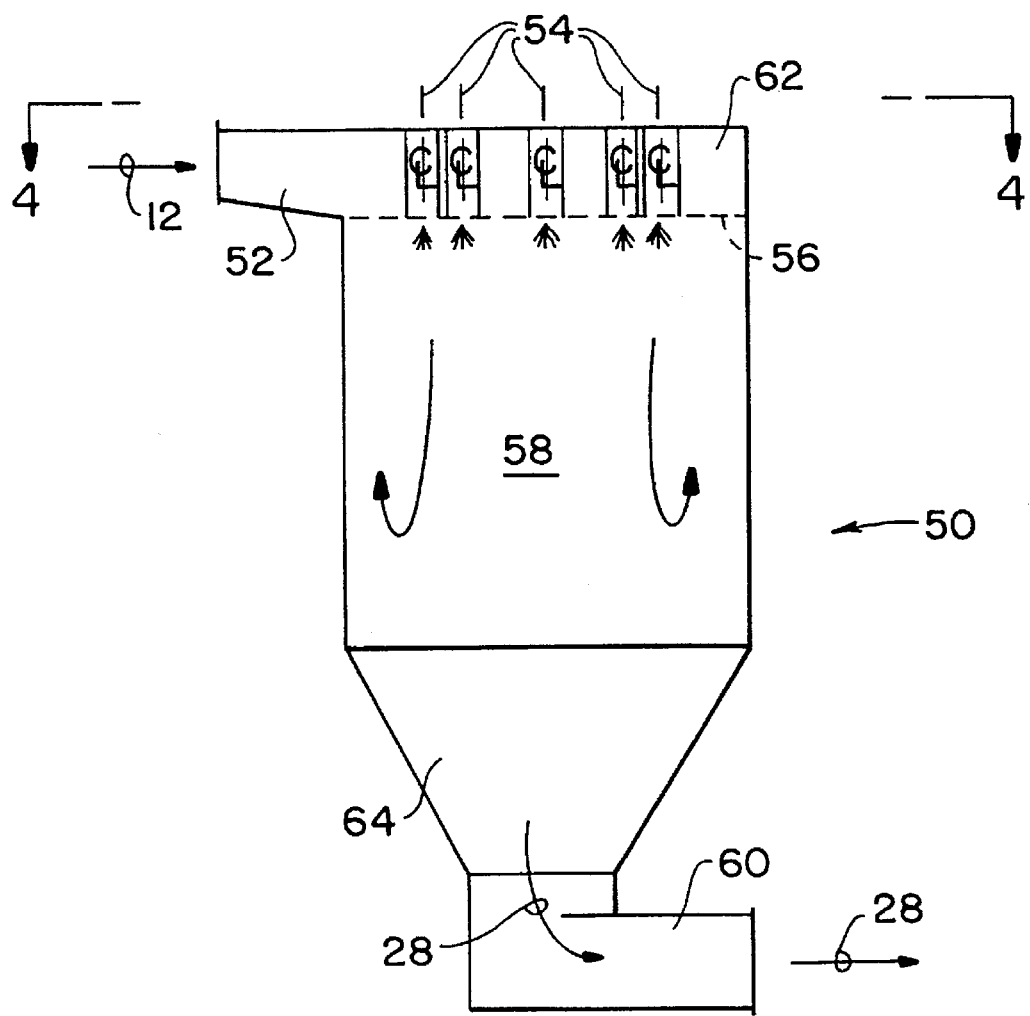
FIG. 3 is a sectional side view of a low pressure drop, turbulent mixing zone dry scrubber according to the present invention.

Referring to the drawings generally, wherein like numerals represent the same or functionally similar elements throughout the several drawings, and to FIGS. 3 and 4 in particular, there is shown a first embodiment of the present invention.

The present invention illustrated in FIGS. 3-4 comprises a vertical dry scrubber 50 having an inlet 52 for the introduction of untreated flue gas 12 (i.e., containing sulfur oxides, acid gases, particulates and air toxics) into the dry scrubber 50. Atomizer means, comprising a single or multiple array of atomizers, schematically represented as 54, and preferably of the dual-fluid type disclosed in U.S. Pat. No. 4,819,878 to Bailey et al., are arranged just downstream of inlet 52 at an upper portion of dry scrubber 50. As the flue gas 12 enters the dry scrubber 50 through the inlet 52, it is directed downward through one or more low pressure drop flue gas distribution means 56 such as perforated, ported, or slotted plates which serve to distribute the flue gas 12 into a spray absorption mixing region 58 within the dry scrubber 50. The flue gas distribution means 56 can comprise a number of openings which are equal to or greater than the number of atomizers 54 used in the scrubber 50.

Atomizers 54 spray a finely atomized alkali solution or slurry reagent into the hot flue gas 12 stream within the spray absorption region 58 for absorbing sulfur oxides and other contaminants. The reactions occur within seconds of spraying the alkali solution or slurry reagent into the hot flue gas stream; the available heat of the flue gas 12 evaporates the liquid from the slurry droplets which lowers the temperature of the outlet gas 28 and produces a relatively dry product. Treated flue gas 28 exits the dry scrubber 50 at a lower portion thereof via outlet 60.

The dry scrubber 50 according to the present invention provides for a low pressure drop inlet section 62 which provides a distribution of the flue gas 12 flow across the spray absorption region 58 within the dry scrubber 50 and eliminates the need for high pressure drop wind boxes or roof gas distribution devices which are currently found in the prior art for flue gas 12 distribution.

The arrangement of atomizers 54 spraying the alkali solution or slurry reagent into the spray absorption region 58 is selected to produce such momentum so as to provide a turbulent mixing zone downstream of the gas distribution means 56 while simultaneously ensuring homogeneous distribution of the alkali solution or slurry reagent within the flue gas 12. Also, the high momentum in the center of dry scrubber 50 results in free-jet entrainment and recirculation of treated or partially treated flue gas 12 and dry solids/reaction products along side walls of the dry scrubber 50 to prevent solid deposition thereon.

The homogeneous mixture of particulate/spray dried materials and treated gas continues to travel downward from the spray absorption region 58 and enters a transition 64 prior to exiting the dry scrubber 50 at approximately a right angle through outlet 60. Treated flue gas 28 travels through outlet 60 as shown at approximately a right angle with respect to the direction of the flue gas flow within the spray absorption region 58. The transition 64 is designed to accelerate treated flue gas 28 such that all or part of the particulate/spray dried materials 66 are entrained in the bulk-stream exiting the dry scrubber 50. These materials 66 may be recycled or disposed as required.

Figure 6:
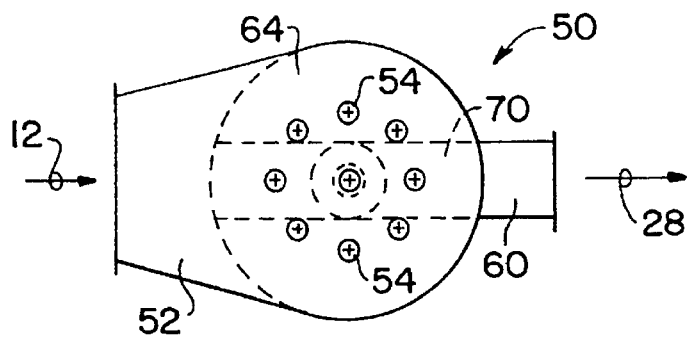
FIG. 6 is a top view of the low pressure drop, turbulent mixing zone dry scrubber of FIG. 5, taken in the direction of arrows 6—6 of FIG. 5, the top plate being omitted for clarity.
Figure 5:
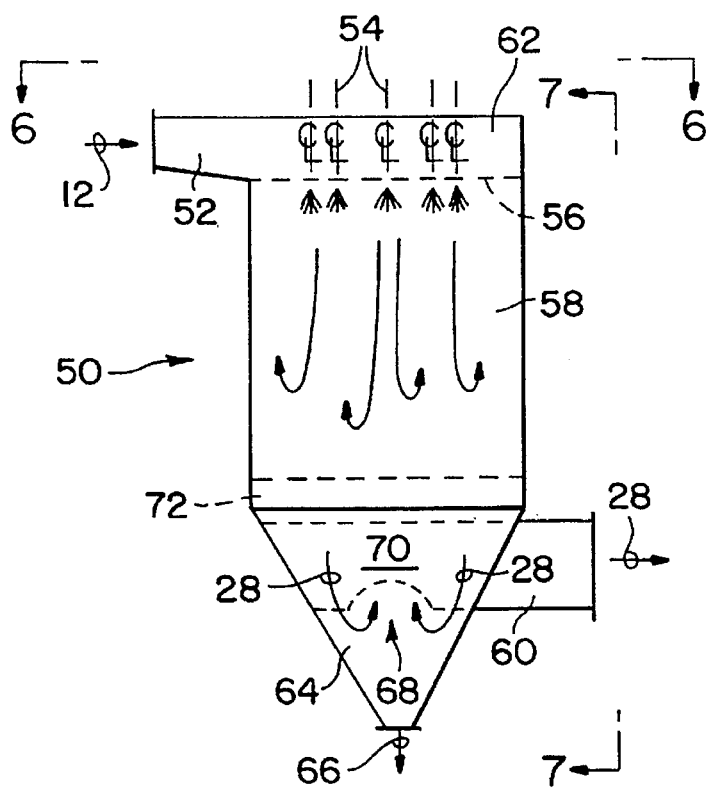
FIG. 5 is a sectional side view of a second embodiment of the low pressure drop, turbulent mixing zone dry scrubber according to the present invention.
Figure 7:
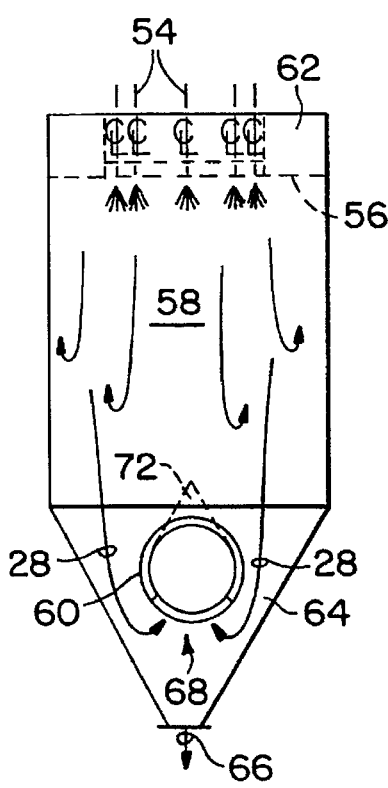
FIG. 7 is a front view of the low pressure drop, turbulent mixing zone dry scrubber of FIG. 5, taken in the direction of arrows 7—7 of FIG. 5.

FIGS. 5–9 illustrate other embodiments of the outlet 60 and transition 64 of the present invention. FIGS. 5–7 illustrate an arrangement where an entrance 68 leading to the outlet 60 is on an underside location of that portion of outlet 60 located within transition 64, generally referred to as 70. Entrance 68 could comprise a single opening placed in the wall of portion 70. Deflector 72 having a triangular shaped configuration may be employed on a top side of that portion of the outlet 60 located within the transition to deflect the flue gas 28 as it proceeds to the outlet 60.

Figure 9:
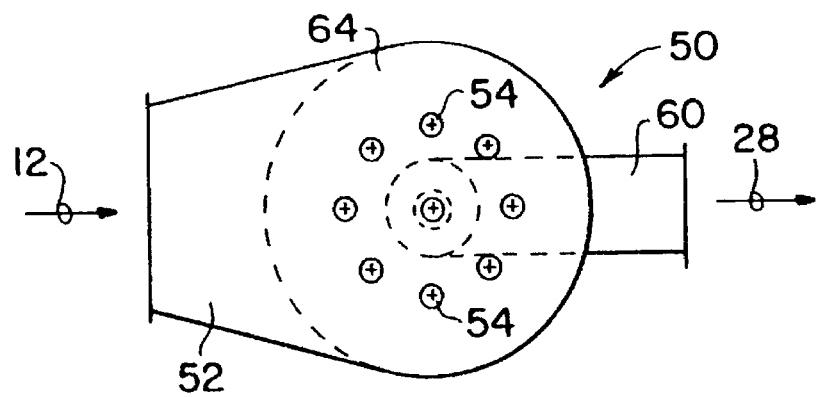
FIG. 9 is a top view of the low pressure drop, turbulent mixing zone dry scrubber of FIG. 8, taken in the direction of arrows 9—9 of FIG. 9, the top plate being omitted for clarity.
Figure 8:
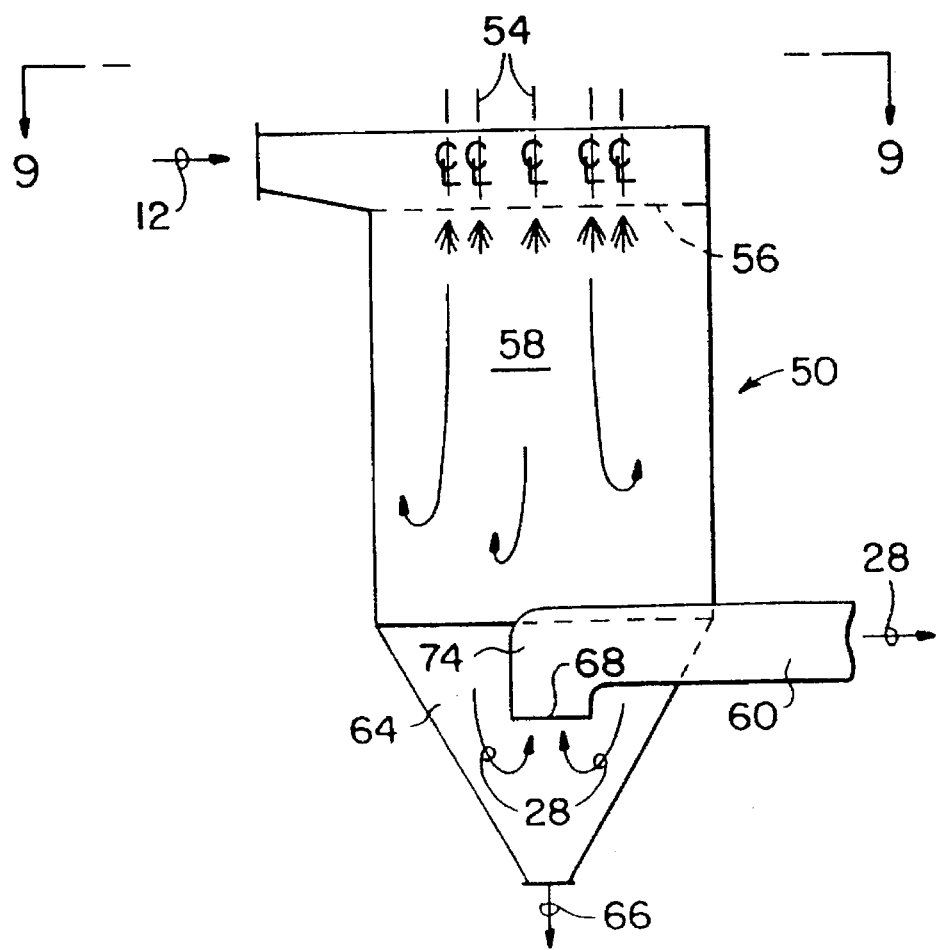
FIG. 8 is a sectional side view of a third embodiment of the low pressure drop, turbulent mixing zone dry scrubber according to the present invention.

FIGS. 8–9 illustrate another arrangement of the outlet 60 and transition 64 of the present invention, where an entrance 68 leading to the outlet 60 is placed on an underside portion of an angled bend 74 located within the transition 64. The bend 74 is located at an angle theta, $\theta$, with respect to the horizontal. The angled bend 74 is shown at a right angle ($\theta=-90°$) but other angles within the range of approximately $\theta=-90°$ to $\theta=+90°$ with respect to horizontal could also be used, as shown in FIG. 10.

Figure 11:
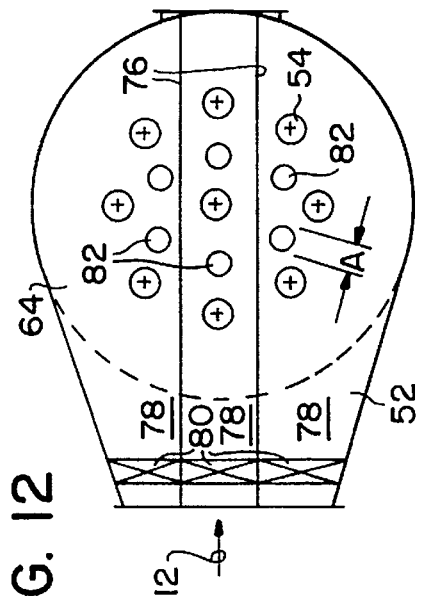
FIG. 11 is a plan view of another embodiment of the low pressure drop inlet section of the present invention, in which the inlet is compartmented by baffles and flue gas flow is controlled by damper means.

FIGS. 11–14 illustrate other embodiments of the low pressure drop inlet section 62 of the present invention which is used to distribute the gas flow to the turbulent mixing zone. FIG. 11 illustrates an arrangement in which the inlet 52 is compartmented by baffles 76 to divide the incoming flue gas 12 into separate flow paths 78. Flow distribution devices or damper means 80 are provided to separately control a rate of flue gas 12 flow in each separate flow path 78. In this embodiment, atomizers 54 are located evenly around a midpoint and all the plate perforations or openings are the same diameter "A". The distance "C" from the atomizers 54 to the wall of the dry scrubber 50 is the same for all atomizers 54 but can be changed depending upon the desired distribution and inlet and outlet configurations.

Figure 12:
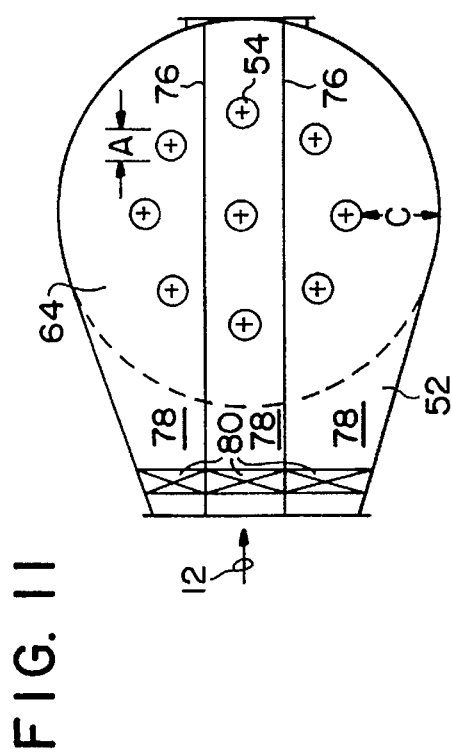
FIG. 12 is a view similar to FIG. 11, and in which open or valve ports are added to increase the velocity in the central area.
Figure 13:
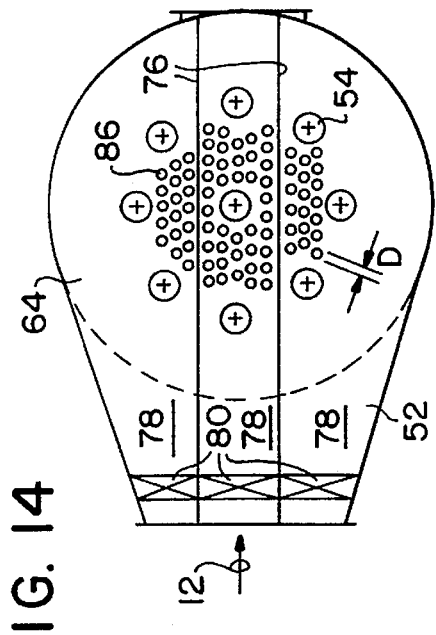
FIG. 13 is another view similar to FIG. 11 in which open or valved ports are added to increase the velocity in the central area, and in which larger openings are used where no atomizer means are provided.
Figure 14:
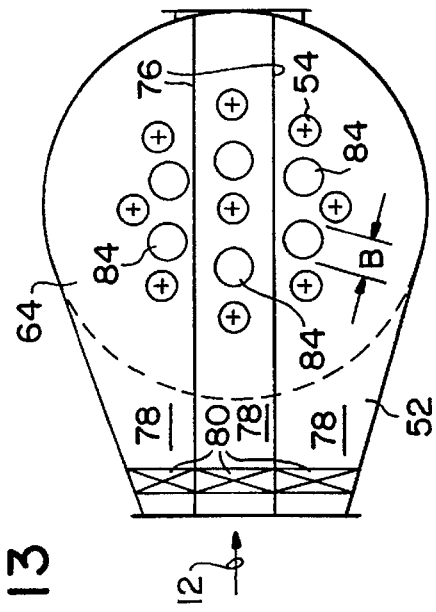
FIG. 14 is a view similar to FIG. 11 wherein a plurality of multiple smaller open or valved ports are added to increase the velocity in the central area.

FIGS. 12 and 13 illustrate other embodiments in which open or valved ports 82 are added to increase the velocity in the central area. FIG. 13 illustrates an embodiment in which ports 84 having a larger diameter B are provided in certain areas to import a higher gas flow, while FIG. 14 shows ports 86 having a smaller diameter D may be provided and in other areas to restrict the flue gas 12 flow therethrough.

For all FIGS. 11–14, the damper means 80 are used to balance flue gas 12 flow and for load following. Though three flow paths 78 are shown, one or more flow paths 78 can be used with damper means 80.

In the present invention, the flow of both reagent and air to the individual atomizers 54 are controlled independently, as disclosed in U.S. Pat. No. 4,819,878, the text of which is hereby incorporated by reference. Flow control (not shown) is by control valves, orifice nozzles or other means. Independent flow control creates the homogenous turbulent mixing zone using the free entrainment of the atomized spray to control mixing. Generally, the total atomized spray will be controlled proportionally to the local flue gas 12 flow. That is, an atomizer 54 in a larger flow area will have a proportionally higher reagent spray rate than an atomizer 54 in a low flue gas 12 flow area.

The present invention provides for control of both flue gas 12 and reagent flow in a low gas side pressure drop, turbulent mixing zone dry scrubber 50. The flue gas 12 flow is controlled by changing the size and number of perforations, using open or valved ports, using dampers, or by using other flow control devices.

The present invention provides for low gas side pressure drop across the dry scrubber 50 by eliminating the bulk gas flow distribution devices found in the prior art such as high pressure drop wind boxes, diffusers, or roof gas distribution devices. The present invention enhances sulfur oxide and other contaminant removal efficiency and reagent utilization by operating the present invention at lower outlet gases temperatures, i.e. a lower approach to saturation. A lower overall pressure drop provided by the present invention results in lower operating costs.

The present invention allows for better accommodation of flue gas temperature stratification and/or flow imbalances within the chamber by controlling a flow of alkali solution or slurry reagent to individual nozzles comprising the atomizer means 54. This control can be performed automatically on-line by measuring the flue gas flow 12 and the upstream and downstream temperature and/or flow profiles of the dry scrubber 50.

The use of dual-fluid atomizers 54 provides sufficient atomization quality (fine droplets) and requires less energy as compared to the atomizers currently used in known dry scrubbers.

Flow to the individual atomizers is changed with control valves, by isolation, or through initial design to cause a flow proportional to the local gas flow.

While a specific embodiment of the invention has been shown and described in detail to illustrate the application of the principles of the invention, it will be understood that the invention may be embodied otherwise without departing from such principles.

We claim:

1. A low pressure drop, turbulent mixing zone dry scrubber for removing sulfur oxides and other contaminants from flue gas, comprising:

a vertical chamber having a top and bottom for treating the flue gas;

an inlet for providing flue gas into the top of the chamber;

a plate having a plurality of perforations including a number of openings through which the flue gas flows for distributing the flue gas into a spray absorption mixing region of the chamber located beneath the plate, wherein some of the openings provided in the plate have a larger diameter to import a higher gas flow into the chamber;

atomizer means, comprising a number of atomizers and positioned at an upper portion of the chamber in the vicinity of the plate, for spraying a reagent into the flue gas within the mixing region after the flue gas has been distributed past the atomizer means and into the mixing region by the plate, the number of openings in the plate greater than the number of atomizers, the atomizer means homogeneously mixing the reagent with the flue gas in the mixing region for treating the flue gas by absorbing sulfur oxides and other contaminants from the flue gas to produce treated flue gas;

a transition located at a lower portion of the chamber; and an outlet beneath the mixing region for directing the treated flue gas out of the chamber, the outlet having a portion located within the transition, an entrance leading to the outlet located on an underside location of said portion of the outlet located within the transition, and a deflector on a top side of said portion of the outlet located within the transition to deflect the flue gas as it proceeds to the outlet.

2. The dry scrubber according to claim 1, wherein the perforations have a size, location, and number selected to maintain a homogeneous, turbulent mixing zone in the mixing region.

3. The dry scrubber according to claim 1, wherein some of the openings are large enough to be and are occupied by the atomizers while at the same time still permitting flue gas to flow through the occupied openings.

4. The dry scrubber according to claim 1, wherein the atomizer means comprises dual-fluid atomizers.

5. The dry scrubber according to claim 1, further comprising baffles located at an upper portion of the chamber for dividing incoming flue gas provided to the chamber into separate flow paths.

6. The dry scrubber according to claim 5, wherein the separate flow paths are provided with damper means for separately controlling a rate of flue gas flow in each separate flow path.

7. The dry scrubber according to claim 1, wherein the outlet is oriented to direct the treated flue gas out of the chamber at approximately a right angle with respect to a vertical axis of the dry scrubber.

8. The dry scrubber according to claim 1, wherein the entrance leading to the outlet is located at an angle θ lying within a range approximately −90° to +90° with respect to the horizontal.

* * * * *